(12) United States Patent
O'Neill (10) Patent No.: US 6,789,504 B1
(45) Date of Patent: Sep. 14, 2004

(54) BALE FEEDER FOR HORSES

(76) Inventor: Edward J. O'Neill, 14533 Sixes Rd., Emmitsburg, MD (US) 21727

( * ) Notice: Subject to any disclaimer, the term of this patent is extended or adjusted under 35 U.S.C. 154(b) by 0 days.

(21) Appl. No.: 10/702,932

(22) Filed: Nov. 6, 2003

(51) Int. Cl.[7] ................................................. A01K 5/00
(52) U.S. Cl. ........................................ 119/58; 414/24.5
(58) Field of Search .............................. 119/58, 59, 60; 414/24.5

(56) References Cited

U.S. PATENT DOCUMENTS

| | | | |
|---|---|---|---|
| 205,522 A | * 7/1878 | Blair | 119/58 |
| 390,259 A | * 10/1888 | Schwartz | 119/58 |
| 418,006 A | * 12/1889 | Gill | 119/59 |
| 1,234,349 A | * 7/1917 | Kohlmeier | 119/58 |
| 3,922,036 A | * 11/1975 | Kalsbeck et al. | 298/18 |
| 5,000,122 A | * 3/1991 | Smith | 119/58 |
| 5,496,145 A | * 3/1996 | Monin | 414/24.5 |
| D371,228 S | * 6/1996 | Monin | D30/121 |
| 5,586,519 A | * 12/1996 | Wilkinson | 119/60 |
| 6,497,196 B1 | * 12/2002 | Helton | 119/60 |
| D472,681 S | * 4/2003 | Melius | D30/133 |

OTHER PUBLICATIONS

Internet Advertisement for Sioux Steel Company, entitled "Hay Horse Feeder".
Internet Advertisement for Common Sense Manufacturing, Inc., entitled "The Common Sense BALEFEEDER".

* cited by examiner

Primary Examiner—Peter M. Poon
Assistant Examiner—Bethany L. Griles
(74) Attorney, Agent, or Firm—Miller Law Group, PLLC (57) ABSTRACT

A round bale hay feeder is designed for utilization specifically by horses. The round bale feeder is formed with a generally horizontal cylindrical body that is supported above the ground by support legs that positioned the cylindrical body at a height to permit horses to paw at the hay without subjecting their legs to injury. The cylindrical body is formed from a series of parallel rings that are horizontally spaced a sufficient distance to provide for an open feeding by horses. A roof is mounted on the cylindrical body to shield the hay partially from the elements. A perforated floor covers the bottom of the cylindrical body to retain the hay within the body while allowing the passage of air to the hay.

20 Claims, 6 Drawing Sheets

BALE FEEDER FOR HORSES

BACKGROUND OF THE INVENTION

The present invention is directed to hay bale feeders for use in dispensing hay as a food source for animals and, more particularly, to a feeding device that is suited for utilization with round bales for feeding hay to horses.

The known process for feeding hay to animals, such as horses, typically results in an inefficient loss of hay from the feeder, which becomes unavailable to the animals. Furthermore, the design of the known hay feeders does not adequately deter or prevent injuries to animals, such as horses, which are easily frightened while eating.

Round hay bales are typically formed in a cylindrical shape and weigh more than 1000 pounds. As a result, round hay bales are normally transported by tractors or skid steer loaders on spear-like carriers designed to impale the end of the cylindrical bale. Dispensing the hay to the animals is often the process of dropping the round bale on the ground in an open area for access by the animals to be fed. Such a feeding process exposes the hay to contamination from ground moisture, the weather, animal wastes and dirt. Furthermore, the hay can become a marking territory for the dominant horses and bedding material for others. Accordingly, this feeding process generally wastes up to 50% of the hay with respect to being available for feed for the animals. Therefore, feeding animals in the open range or pasture by dropping the round hay bale on the ground increases feeding costs. Furthermore, since a round bale of hay under these conditions is not likely to last for four days for four horses during the winter, increased costs of transporting additional round bales also adds to the cost of feeding hay to the animals.

Most round bale feeders that are commercially available are designed to minimize the waste issues associated with the dropping of the round bale onto the ground, but are more generalized for use by stock farm animals and are not particularly well adapted for use by horses. Horses are herd animals that instinctively rely on large numbers for safety. Horses are easily spooked and move quickly when startled by noise, smells, strong winds and even other dominant horses. Injuries to horses are often self-imposed when yielding to more dominant horses. When near feeders that have sharp edges or protrusions, horses often jump without looking and land hard on the edges or protrusions and receive corresponding injuries. Furthermore, horse can become entangled in conventional hay feeders when attempting to jump over the feeder to avoid being kicked or bitten by other more dominant horses.

Accordingly, it would be desirable to provide a round bale hay feeder for horses that would minimize the opportunity for injury to the horses, while providing a feeding environment that will minimize waste for the hay product being dispensed to the horses.

SUMMARY OF THE INVENTION

It is an object of this invention to overcome the aforementioned disadvantages of the prior art by providing a round bale hay feeder that is designed to be utilized by horses.

It is another object of this invention to provide a round bale hay feeder that minimizes the loss of hay as a source of feed material to horses.

It is a feature of this invention that the round bale feeder does not have any sharp edges or protrusions exposed externally for impact by horses while eating hay therefrom.

It is an advantage of this invention that the round bale feeder is designed for use by horses.

It is another feature of this invention that the round bale feeder is formed in a horizontally extending cylindrical body to conform to the general shape of round bales of hay to be dispensed therefrom.

It is another advantage of this invention that the design of the cylindrical body of the round bale feeder minimizes the chances of injury from a horse running into the feeder structure.

It is still another feature of this invention that the height of the feeder structure above the ground is designed to facilitate feeding therefrom by horses.

It is still another advantage of this invention that the height of the cylindrical body of the round bale feeder above the ground protects horses legs from injuries.

It is yet another feature of this invention that the cylindrical body provides wide openings for access to the hay by horses.

It is yet another advantage of this invention that the access of hay by horses via an insertion of their head into the cylindrical body of the round bale feeder does not result in the loss of mane hair.

It is a further feature of this invention that the round bale feeder protects the round bale of hay from the elements by providing a roof over the cylindrical body housing the round bale of hay.

It is a further advantage of this invention that the round bale of hay is more efficiently dispensed to horses, resulting in less loss and lower cost.

It is yet another object of this invention to provide a round bale feeder for dispensing hay as a feed from a round bale to horses that is durable in construction, inexpensive of manufacture, carefree of maintenance, facile in assemblage, and simple and effective in use.

These and other objects, features and advantages are accomplished according to the instant invention by providing a round bale hay feeder adapted for utilization specifically by horses. The round bale feeder is formed with a generally horizontal cylindrical body that is supported above the ground by support legs that positioned the cylindrical body at a height to permit horses to paw at the hay without subjecting their legs to injury. The cylindrical body is formed from a series of parallel rings that are horizontally spaced a sufficient distance to provide for an open feeding by horses. A roof is mounted on the cylindrical body to shield the hay partially from the elements. A perforated floor covers the bottom of the cylindrical body to retain the hay within the body while allowing the passage of air to the hay.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring to the drawings, a round bale feeder incorporating the principles of the instant invention can best be seen. The round bale feeder 10 includes a generally horizontally disposed cylindrical body 12 formed from tubular rings 13, preferably fabricated from tubular steel that includes a covering, such as paint, to prevent rusting while exposed to the weather. The circular rings 13 are arranged in a parallel orientation spaced horizontally a distance sufficient to permit a horse's head to enter between adjacent rings 13 without the horses being afraid to place their head into a small opening, or to rub their mane hair off their head. A longitudinal spacing of about 18 inches is adequate for the purposes intended. The diameter of the rings 13 is preferably approximately six feet, while the overall length of the cylindrical body is also preferably approximately six feet, to permit the introduction of a conventional round bale of hay as will be described in greater detail below.

Figure 4:
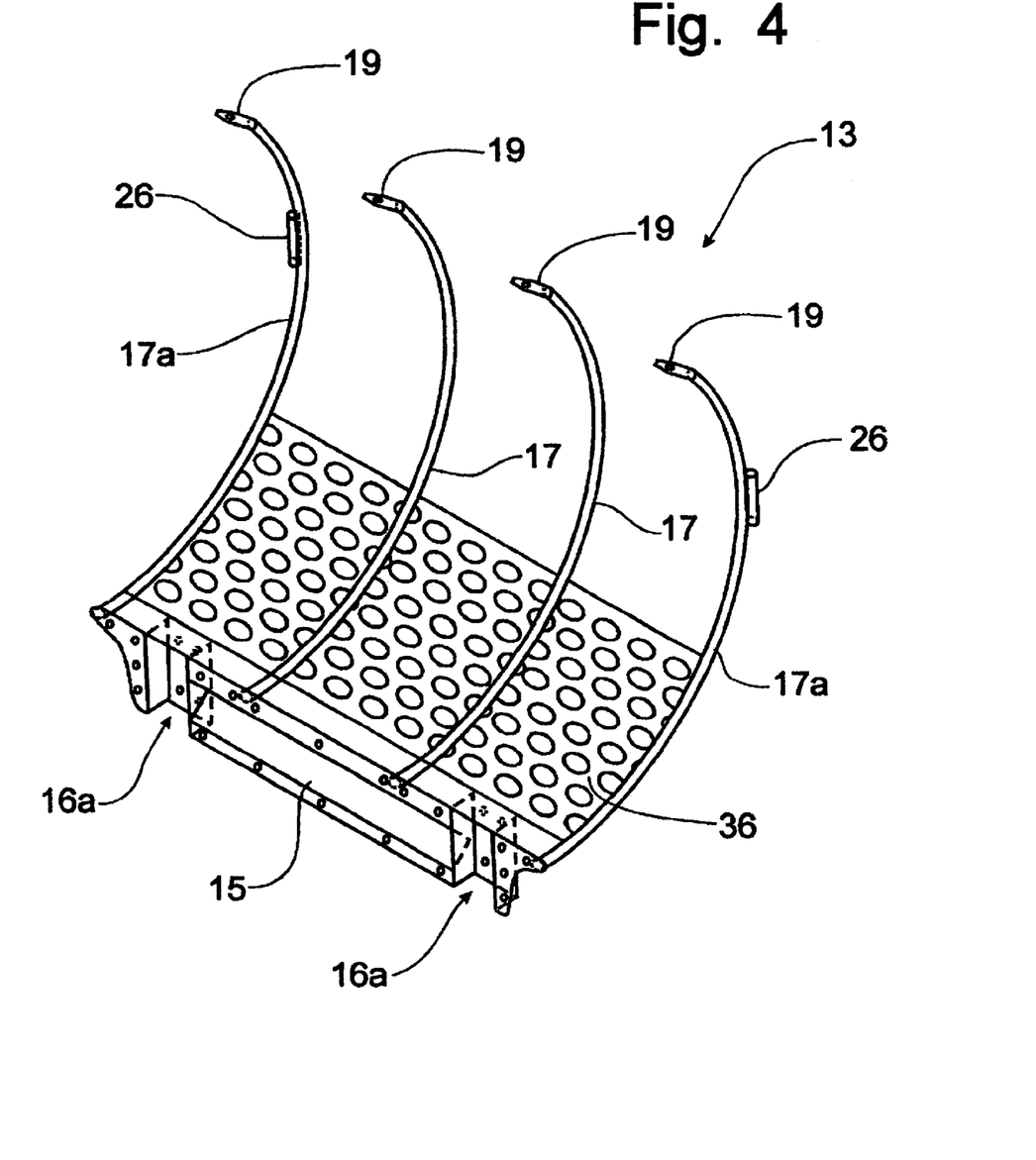
FIG. 4 is a perspective view of a weld assembly forming a portion of the cylindrical body of the round bale feeder.
Figure 5:
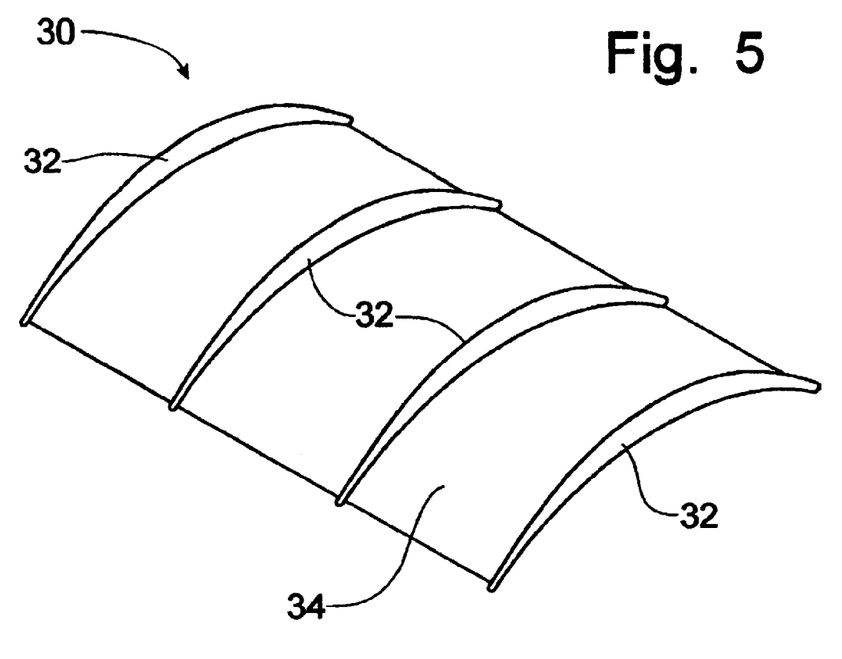
FIG. 5 is a perspective view of the roof member.

As best seen in FIGS. 4 and 5, the cylindrical body is formed from three major weld assemblies, left and right corresponding body weld assemblies 13, as depicted in FIG. 4, and a roof weld assembly 30 depicted in FIG. 5. Each body weld assembly 13 is formed from a longitudinal central frame member 15 and a plurality of attached ring segments 17 that are connected to the longitudinal frame member 15 that serves to support the ring segments 17 and to maintain spacing therebetween. The frame member 15 incorporates a pair of longitudinally spaced box member portions 16 near opposing ends of the frame member 15 that receive supports 44, as will be described in greater detail below. The upper end of each ring segment 17 is formed in a manner to permit connection of the roof weld assembly 30, such as by flattening the ends of the tubular ring segments and forming an opening therein.

Figure 6:
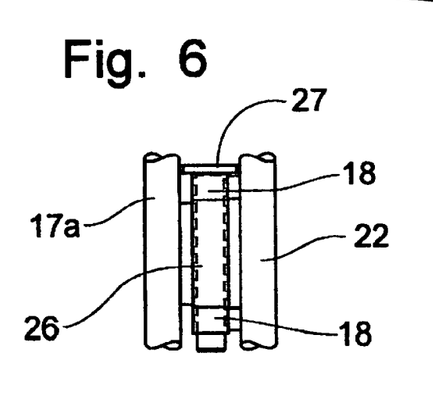
FIG. 6 is an enlarged detail view of the hinge mounting the door to the endmost ring of the cylindrical body.
Figure 7:
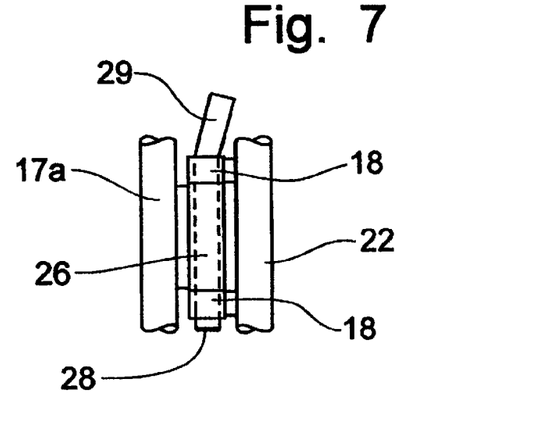
FIG. 7 is an enlarged detail view of the latch connecting the door to the endmost ring of the cylindrical body.

Each endmost ring segment 17a is formed with a hinge tube 26 to mate with a pair of vertically spaced hinge lugs 18 on the corresponding door 20, as is depicted in FIG. 6 through which a hinge pin 27 is positioned to pivotally mount the door 20 to the corresponding endmost ring 17a. The opposing body weld assembly 13 is formed identically so that a hinge mechanism 18, 26 is positioned on both transverse sides of the cylindrical body 12 and on both ends of the cylindrical body 12. Accordingly, the door 20 on either respective end of the cylindrical body 12 can be pivotally hinged at either respective transverse side in the manner depicted in FIG. 6. The opposing transverse side of the endmost ring segment 17a can then be used to form the latch by using a latch pin 28 passing through aligned hinge lugs 18 and hinge tube 26. The latch pin 28 is preferably formed with a bend end 29 or other appropriate device to facilitate grasping and removing the latch pin 28 to open the door 20 to the cylindrical body 12. Preferably, the hinge pin 27 has a larger diameter than the latch pin 28 because the latch pin 28 is preferably retained loosely in the corresponding hinge lugs 18 and hinge tube 26.

Referring now to FIG. 5, the roof weld assembly 30 is formed with a plurality of arcuate segments 32 interconnected by longitudinally extending frame rails 33. The arcuate segments 32 support a roof member 34 to cover the upper portion of the cylindrical body 12. The longitudinal frame rails 33 are formed with openings therein that align with the connecting ends 19 of the ring segments 17, thus permitting the roof weld assembly 30 to be detachably connected by fasteners to the opposing body weld assemblies 13. The opposing body weld assemblies 13 are detachably connected by fasteners extending through aligned openings in the respective longitudinally frame members 15. Preferably, the roof member will cover a arcuate segment of about 80 to 120 degrees centered on the top apex of the circular circumference of the cylindrical body 12. Each door 20 can also have mounted thereon a shield 35 that continues the projection of the roof member 34 around the ends of the cylindrical body 12. The roof member 34 and roof shield 35 is preferably formed from sheet metal.

The joined longitudinal frame members 15 form fore-and-aft completed box sections 16 that define vertical support legs 16a into the longitudinal frame members 15. Each support leg 16a could optionally extend downwardly at the centerline of the cylindrical body 12, but are adapted to receive a support post 44, 46 to minimize contact between the support post 44, 46 and cooperative support leg 16a with the horses accessing hay within the feeder 10. When the support posts 46 are firmly supported in the ground, the cylindrical body 12 is rigidly supported for access to the hay therein by animals, such as horses. To further minimize engagement between the legs of the horses and the support posts 44, 46, the posts 44, 46 and support legs 16a are constructed to position the bottom apex of the circumference of the cylindrical body 12 at a location approximately 30–36 inches above the surface of the ground.

Figure 8:
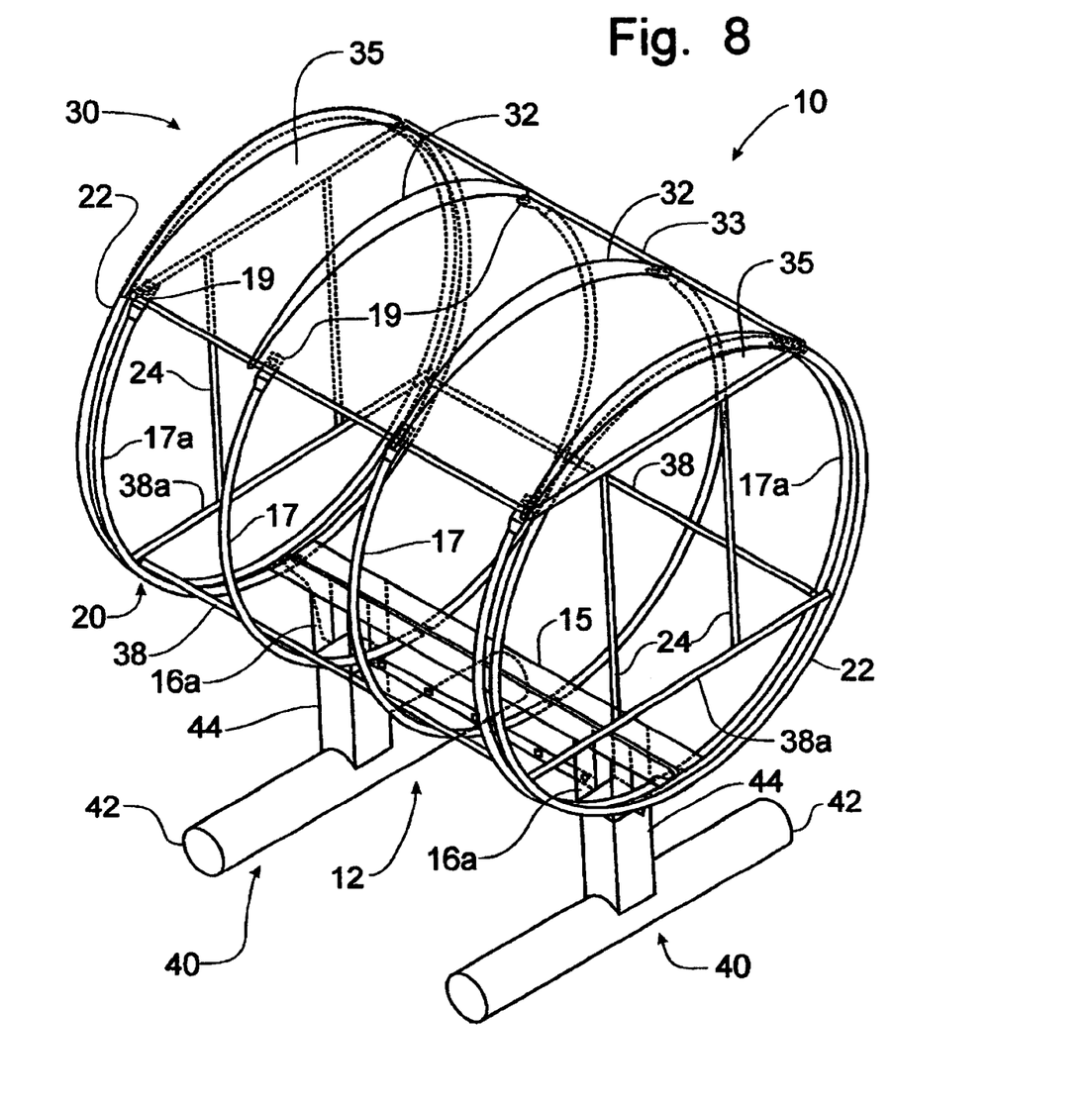
FIG. 8 is a perspective view of an alternative embodiment of the round bale feeder adapted for movement across a field from one location to another, the perforated floor covering being deleted for purposes of clarity.
Figure 9:
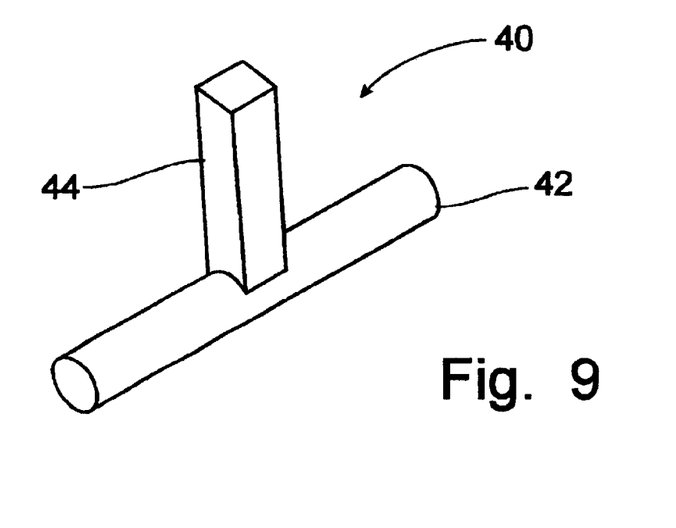
FIG. 9 is a perspective view of the skid member shown in FIG. 8.

The round bale hay feeder 10 can be adapted for mounting on support posts 46 that are fixed into the ground, thus providing a stationary round bale feeder 10 for horses or other livestock. The box section support legs 16a would receive a corresponding support post 46, which would then preferably be fastened to the support leg 16a by fasteners passing through aligned openings in the support legs 16a and corresponding support posts 46. Alternatively, as is best depicted in FIGS. 8 and 9, the longitudinal frame member 15 could be attached to skid members 40 formed from a transverse length of round tubing to define a transverse ground-engaging skid 42 with an upright support post 44 affixed to the skid 42. The support post 44 would be received in each of the support legs 16a and attached thereto by fasteners passing thorough aligned openings. Thus, the round bale hay feeder 10 can be mobile in that a tractor or other prime mover could slide the round bale hay feeder 10 from one location to another with the transverse skids 42 riding over the ground. The skid members 40 can be made in alternative lengths to provide a round bale feeder 10 that is particularly utilizable by horses, and a lower version that is particularly utilizable by livestock, such as cattle.

Figure 1:
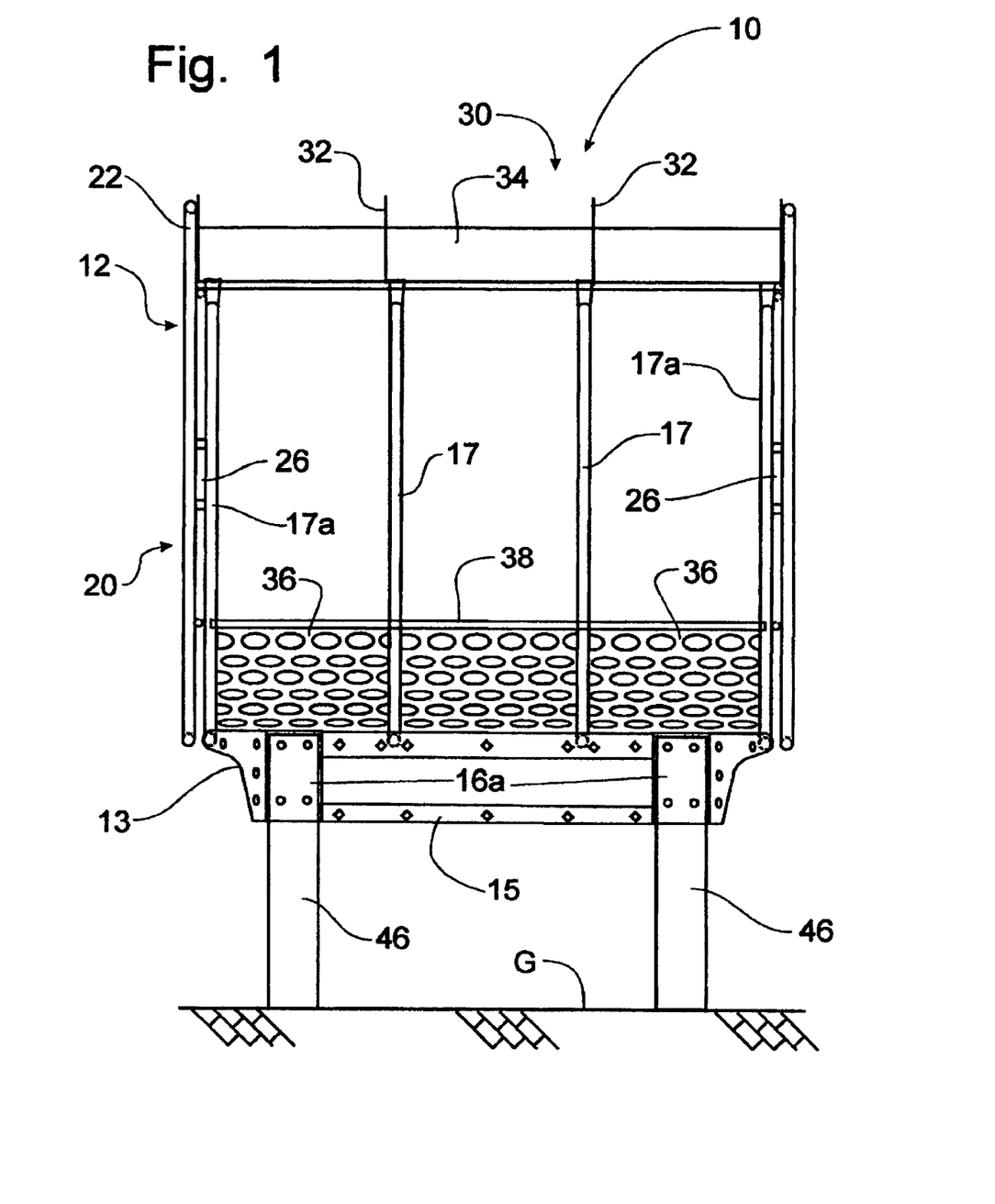
FIG. 1 is a side elevational view of a round bale feeder incorporating the principles of the instant invention.
Figure 2:
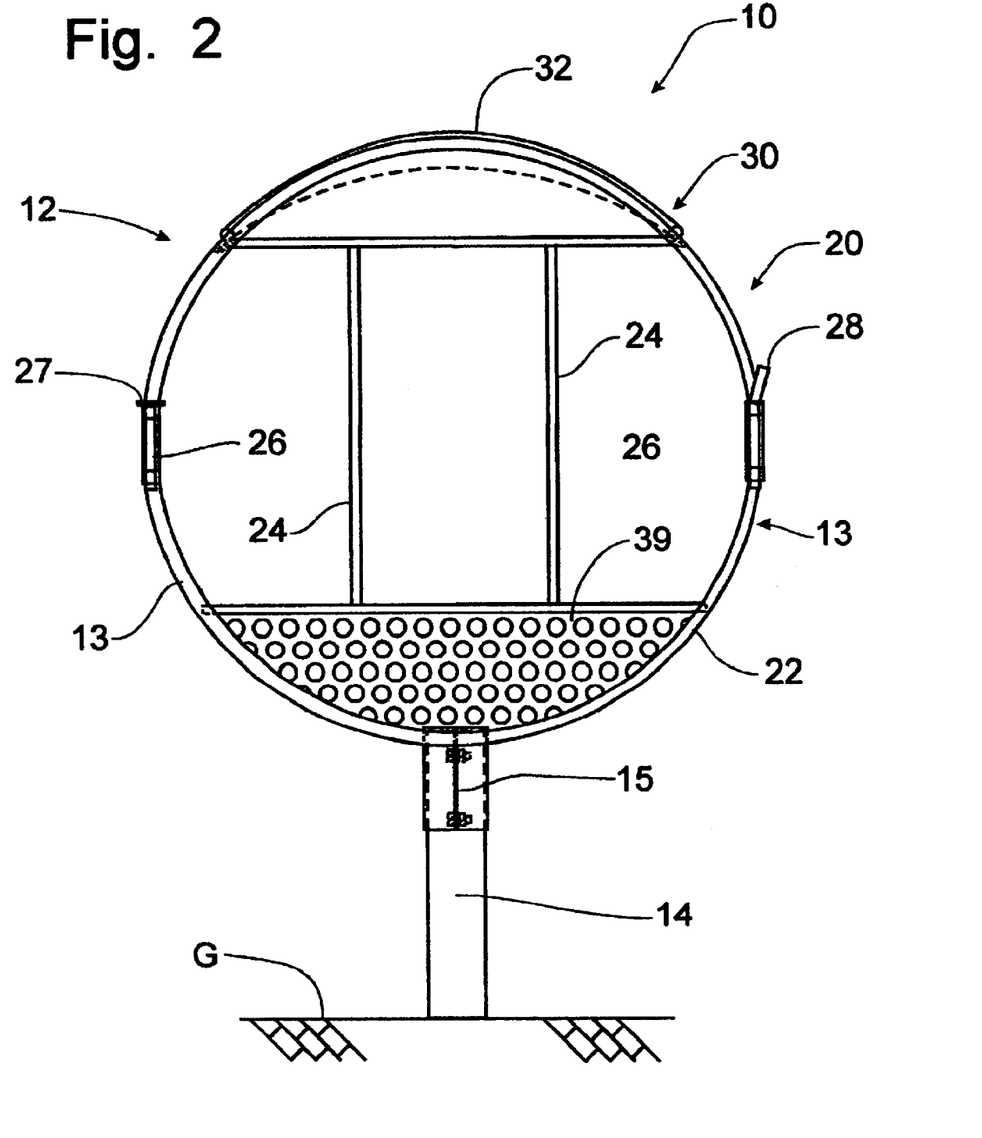
FIG. 2 is a end elevational view of the round bale feeder shown in FIG. 1.
Figure 3:
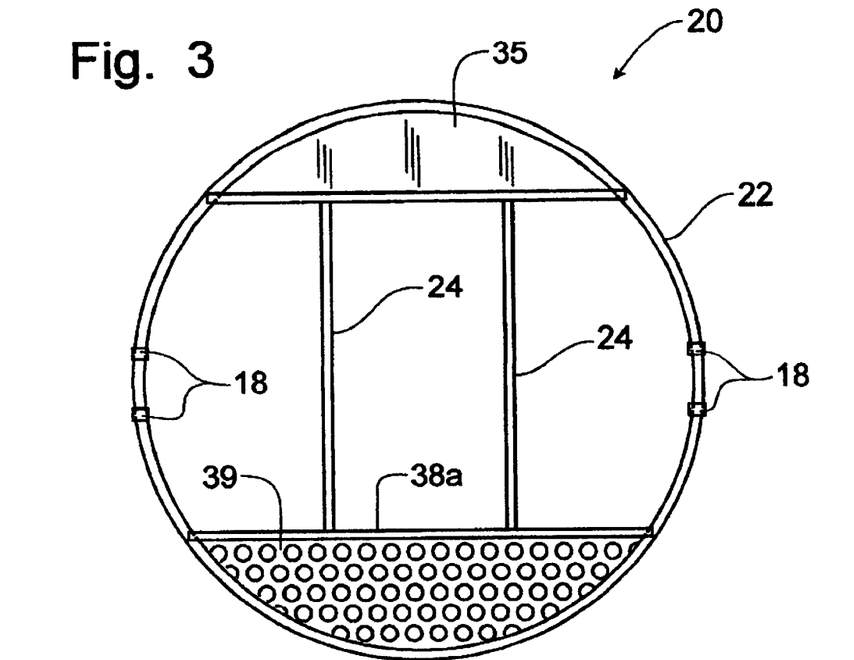
FIG. 3 is an elevational view of a door pivotally mounted on the ends of the cylindrical body.

To restrict access to the interior of the cylindrical body 12, each end thereof has preferably mounted thereon a door 20, best seen in elevation in FIG. 3. Each door 20 is preferably formed in a circular configuration having a diameter substantially equal to the cylindrical body 12. As noted above, a door is pivotally mounted on hinge pins 27 supported on corresponding endmost ring segments 17a at each end of the cylindrical body 12. Each door is formed from a circular ring 22 to which is welded a support frame 24 that spans across the interior of the circular ring 22. The hinge lugs 18 are welded on the circular ring 22 in general longitudinal alignment with the support frame 24, which as best seen in FIG. 1 lies on the interior of the door 20 to minimize engagement therewith by the horses.

The lower portion of the cylindrical body 12 has mounted thereto a perforated flooring member 36, which can be in the form of a wire mesh, a screen, or preferably perforated sheet metal, that covers an arcuate segment of about 80 to 120 degrees centered on the lower apex of the circular circumference of the cylindrical body 12. The perforated flooring 36 retains the hay within the feeder 10 while permitting the passage of air into the hay for the purpose of drying any moisture that may collect in the hay from the weather. Preferably, the cylindrical body 12 will be provided with a buffer rail 38 along the upper edge of the wire mesh flooring 35 to provide a support for mounting the flooring member 35, but more importantly, to protect the horses from injury from the edger of the flooring member 35 when reaching into the interior of the cylindrical body 12 to reach hay therein. Preferably, each door section 22 is also provided with a similar perforated flooring cover 39 along the lower portion thereof to correspond to the projection of the flooring member 36 around the ends of the cylindrical body 12. In addition, the support frame 24 of each door 20 also forms a buffer rail 38a that is in alignment with the buffer rail 38 on the sides of the cylindrical body 12 for the same purposes as expressed above with respect to the buffer rail 38.

In operation, a round bale of hay is delivered to the rounder bale feeder 10 in a conventional manner via a tractor or loader. After opening the door 20 at one end of the cylindrical body 12, the round bale (not shown) is inserted into the interior of the cylindrical body 12 and rested on the lower portion of the rings segments 17 against the perforated flooring member 36. The door 20 is then closed and latched to prevent unintentional opening, and access is then available to horses desiring hay to eat. The roof structure 30 will shed most of the rain or snow from the top surface of the hay within the cylindrical body 12, thus helping to prevent spoilage of the hay. Also, the passage of air through the perforated flooring member 36 will facilitate the drying of any moisture that reaches the hay within the interior of the cylindrical body 12.

The arcuate cylindrical configuration of the body 12 of the feeder 10 minimizes the possibility of injury to a horse due to the horse impacting the feeder 10. Thus, the design of the feeder 10 minimizes serious injuries to horses feeding from the apparatus 10. The configuration of the feeder 10 also provides visual privacy from other horses utilizing the feeder 10, at least with respect to horses utilizing the opposite side of the feeder 10. Since the feeder 10 reduces waste in the way of spillage from the feeder, and with respect to spoilage from the elements, considerable cost savings for providing feed to horses can be achieved through the use of the feeder 10. While the cylindrical body 12 is designed to receive round bales of hay, which are generally 30% cheaper than conventional rectangular bales of hay to purchase or to harvest, one skilled in the art will recognize that the smaller rectangular hay bales could also be loaded into the cylindrical body for feeding to horses. Furthermore, loose hay could also be loaded into the feeder for dispensing to horses. The doors 20 prevent large animals, such as horses, from climbing into the interior of the cylindrical body 12, but does not restrict the horses from accessing the hay within the interior of the cylindrical body 12 through the doors 20, as the spacing of the framework forming the doors 20 is at least as great as the spacing between the upright circular rings 13 forming the cylindrical body 12.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A bale feeder for dispensing hay from a round bale of hay to animals comprising:
    a non-rotatable cylindrical body formed from upright circular rings spaced longitudinally to receive said round bale of hay;
    a frame member connected to said rings to maintain spacing between said rings and to support said rings above the surface of the ground, said cylindrical body projecting transversely outwardly over said frame member for access by said animals to hay loaded within said cylindrical body; and
    at least one support leg connected to said frame member along the longitudinal centerline of said cylindrical body.

2. The bale feeder of claim 1 further comprising:
    a vertically oriented door mounted on each end of the cylindrical body to limit access into the interior of the cylindrical body.

3. The bale feeder of claim 2 wherein each said door is pivotally supported by a hinge member that is mounted on an endmost ring of said cylindrical body.

4. The bale feeder of claim 2 further comprising:
    a roof structure supported on said upright circular rings.

5. The bale feeder of claim 4 wherein each said door has a shield mounted on an upper portion thereof, said shield covering an area on each said door corresponding to a projection of said roof structure around the corresponding ends of said cylindrical body.

6. The bale feeder of claim 2 further comprising:
    a perforated flooring member mounted on a lower portion of said cylindrical body.

7. The bale feeder of claim 6 wherein each said door has a perforated covering mounted on a lower portion thereof, said perforated covering being a projection of said perforated flooring extending around the corresponding ends of said cylindrical body.

8. The bale feeder of claim 7 further comprising:
    a buffer rail mounted on said cylindrical body along a peripheral edge of said perforated flooring member to prevent animals from engaging said peripheral edge of said flooring member.

9. A bale feeder for dispensing hay to horses comprising:
    a cylindrical body formed from upright circular rings oriented in a parallel configuration and spaced at least twelve inches apart;
    a lower frame member for supporting said upright circular rings and maintaining said spacing therebetween;
    an upper member interconnecting said upright circular rings;
    a vertically oriented door mounted on at least one end of said cylindrical body to permit the insertion of a round bale of hay having a size generally corresponding to a diameter dimension of said cylindrical body; and
    at least one support leg connected to said lower frame member to support said cylindrical body above the surface of the ground.

10. The bale feeder of claim 9 wherein said upper member is a roof structure covering an arcuate segment of said cylindrical body of at least 40 degrees to each side of an upper apex of said cylindrical body.

11. The bale feeder of claim 9 further comprising one vertically oriented door mounted on each opposing end of said cylindrical body, each door being pivotally mounted for movement between an opened position and a closed position.

12. The bale feeder of claim 9 further comprising:

a perforated flooring member mounted on a lower portion of said cylindrical body and covering an arcuate segment of said cylindrical body.

13. The bale feeder of claim 9 wherein said lower frame member is connected to a skid member for mobilely supporting said cylindrical body above the ground.

14. The bale feeder of claim 9 wherein said cylindrical body is formed by first and second body assemblies connected to said upper member, each said body assembly is formed with a longitudinal frame member and a plurality of ring segments affixed to said longitudinal frame member, each said ring segment terminating in an upper connecting end.

15. The bale feeder of claim 9 wherein said upper member is a roof structure attached to each said connecting end.

16. A round bale hay feeder comprising:

first and second body assemblies, each said assembly being formed by a longitudinally extending frame member and a plurality of longitudinally spaced ring segments affixed to said longitudinal frame member, said first and second body assemblies being connected at said longitudinal frame members to create a lower frame member defining a pair of support legs; and a fixed roof assembly including longitudinal frame rails supporting a roof member, said frame rails being connected to said ring segments to create a generally cylindrical body.

17. The round bale hay feeder of claim 16 wherein said first and second body assemblies further include a perforated floor member covering an arcuate segment of said ring segments from said longitudinal frame member.

18. The round bale hay feeder of claim 16 wherein said support legs are engaged with skid members for supporting said cylindrical body above the ground at a desired height and for permitting said cylindrical body to be moved over the surface of the ground.

19. The round bale hay feeder of claim 18 wherein said support legs are formed as box sections created by the interconnection of said longitudinal frame members to form said lower frame member, said support legs being located on a centerline of said cylindrical body.

20. The round bale hay feeder of claim 16 wherein each opposing end of said cylindrical body includes a door comprising:

a generally cylindrical ring member having a diameter corresponding to a diameter of said cylindrical body;

a support frame affixed to and spanning across said ring member, said support frame including an upper support member and a lower support member;

a roof shield affixed to an upper portion of said ring member extending upwardly from said upper support member;

a perforated cover affixed to a lower portion of said ring member extending below said lower support member;

a latch member on one side of said ring member; and a hinge member on an opposing side of said ring member.

* * * * *